United States Patent [19]

Recluta

[11] 4,427,849
[45] Jan. 24, 1984

[54] DEVICE FOR CONTROLLING THE ILLUMINATION OF MOTOR VEHICLE LIGHTS

[75] Inventor: Franco Recluta, Turin, Italy

[73] Assignee: Fiat Auto S.p.A., Turin, Italy

[21] Appl. No.: 360,325

[22] Filed: Mar. 22, 1982

[30] Foreign Application Priority Data

Apr. 8, 1981 [IT]   Italy ............................. 53118/81[U]

[51] Int. Cl.³ ............................................ H01H 19/00
[52] U.S. Cl. ..................................... 200/6 R; 29/847;
200/61.27; 200/317
[58] Field of Search ........... 200/6 R, 6 A, 6 B, 6 BA,
200/6 BB, 6 C, 8 R, 8 A, 9, 61.27, 61.38, 61.54,
292, 291, 308–317; 339/17 R; 174/68.5; 29/846,
847

[56] References Cited

U.S. PATENT DOCUMENTS 3,745,524  7/1973  Suzuki ............................. 200/61.27
4,144,430  3/1979  Coldren et al. ..................... 200/292
4,273,971  6/1981  Tregurtha ........................ 200/61.27

FOREIGN PATENT DOCUMENTS 882883 11/1961  United Kingdom ........... 200/6 BA

*Primary Examiner*—E. A. Goldberg
*Assistant Examiner*—Morris Ginsburg
*Attorney, Agent, or Firm*—Michael N. Meller

[57] ABSTRACT

A device for controlling the illumination of motor vehicle lights has support bodies connected together. A plurality of conductive tracks are formed on one of the bodies. At least one lever is pivoted between the bodies in such a way as to be able to assume a plurality of positions against the action of a helical spring. At least one electric contact is carried by the lever. The lever has an arm which projects out from the bodies for manual movement.

14 Claims, 8 Drawing Figures

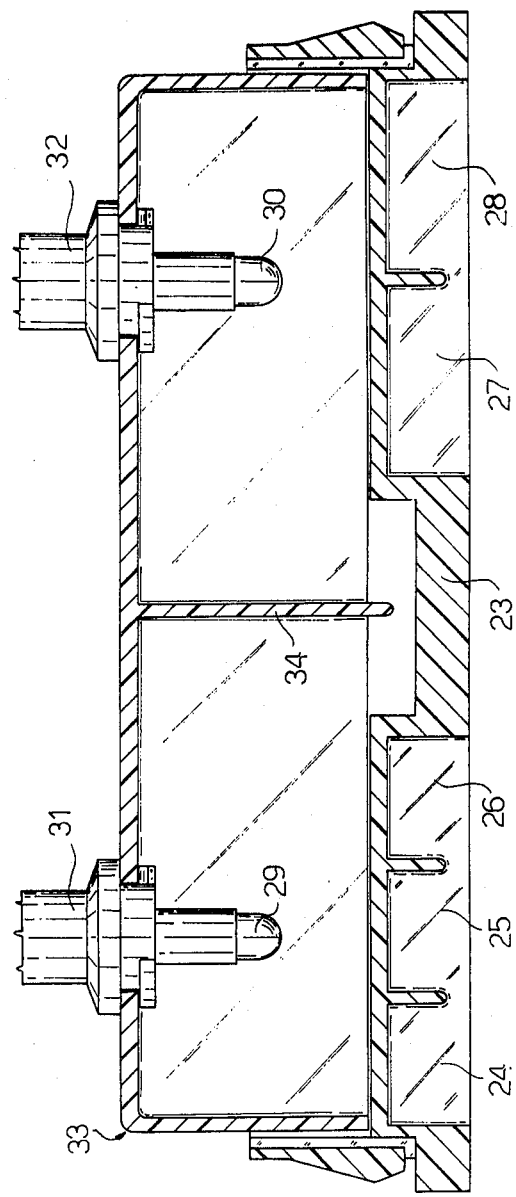
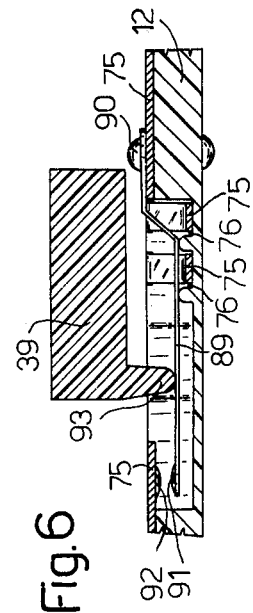
Fig.2
Fig.6

DEVICE FOR CONTROLLING THE ILLUMINATION OF MOTOR VEHICLE LIGHTS

BACKGROUND OF THE INVENTION

The present invention relates to a device for controlling the illumination of the lights of a motor vehicle.

Known control devices have to be able to perform substantially three functions. The first function is that of an interrupter switch to selectively enable supply to the said lights; the second function is that of selectively arranging for the illumination of the side lights alone, or of the main beam or dipped headlights; the third function is that of headlamp flashing, in which supply to the main beam or dipped headlights is provided for in emergency conditions and in particular when the side lights are not turned on.

Devices known at present which perform these three functions are formed in many different ways. In particular, there are devices which provide a switch on the dash board of the motor vehicle, which performs the first function, and a lever pivoted on the steering column of the motor vehicle, which performs the second and third functions. Likewise, there are devices which perform the three functions on the steering column by means of a lever pivoted thereto; the three functions in this case being conveniently obtained by rotating the lever about its own longitudinally axis, displacing the lever angularly with respect to the steering column, and pulling the lever towards the steering wheel. There are, further, other devices which are combinations of the above described devices.

SUMMARY OF THE INVENTION

The object of the present invention is that of providing a device for the control of the illumination of the lights in the headlamps of a motor vehicle which is capable of performing the described functions of known devices, but which will be, with respect to these latter, more economic to manufacture, simpler to assemble and easier to control.

The said object is achieved with the present invention in that it relates to a device for the control of the illumination of motor vehicle lights which can conveniently be housed in a dashboard of the motor vehicle, the said device being characterised by the fact that it comprises:
- first and second support bodies connected together and defining a chamber with their facing surfaces;
- a plurality of tracks of conductive material interposed between the said first and second bodies and facing, at least in part, towards the said chamber;
- at least one lever pivoted between the said first and second body and having a first arm which projects out from the said first and second bodies and which can be manually operated, and a second arm movable within the said chamber delimited by the facing surfaces of the said first and second bodies;
- resilient means interposed between the said lever and one of the said first and second bodies and serving to establish a plurality of angularly spaced working positions of the said lever with respect to the said first and second bodies; and
- at least one electric contact element supported by the second arm of the said lever and operable to connect at least two of the said conductive tracks together.

BRIEF DESCRIPTION OF THE DRAWINGS

For a better understanding of the present invention a preferred embodiment will now be described, by way of non-limitative example, with reference to the attached drawings, in which:

FIG. 2 is a section taken on the line II—II of FIG. 1;

FIG. 6 is a section taken on the line VI—VI of FIG. 4;

FIG. 7 is a section taken on the line VII—VII of FIG. 3; and

DETAILED DESCRIPTION OF THE INVENTION

Figure 1:
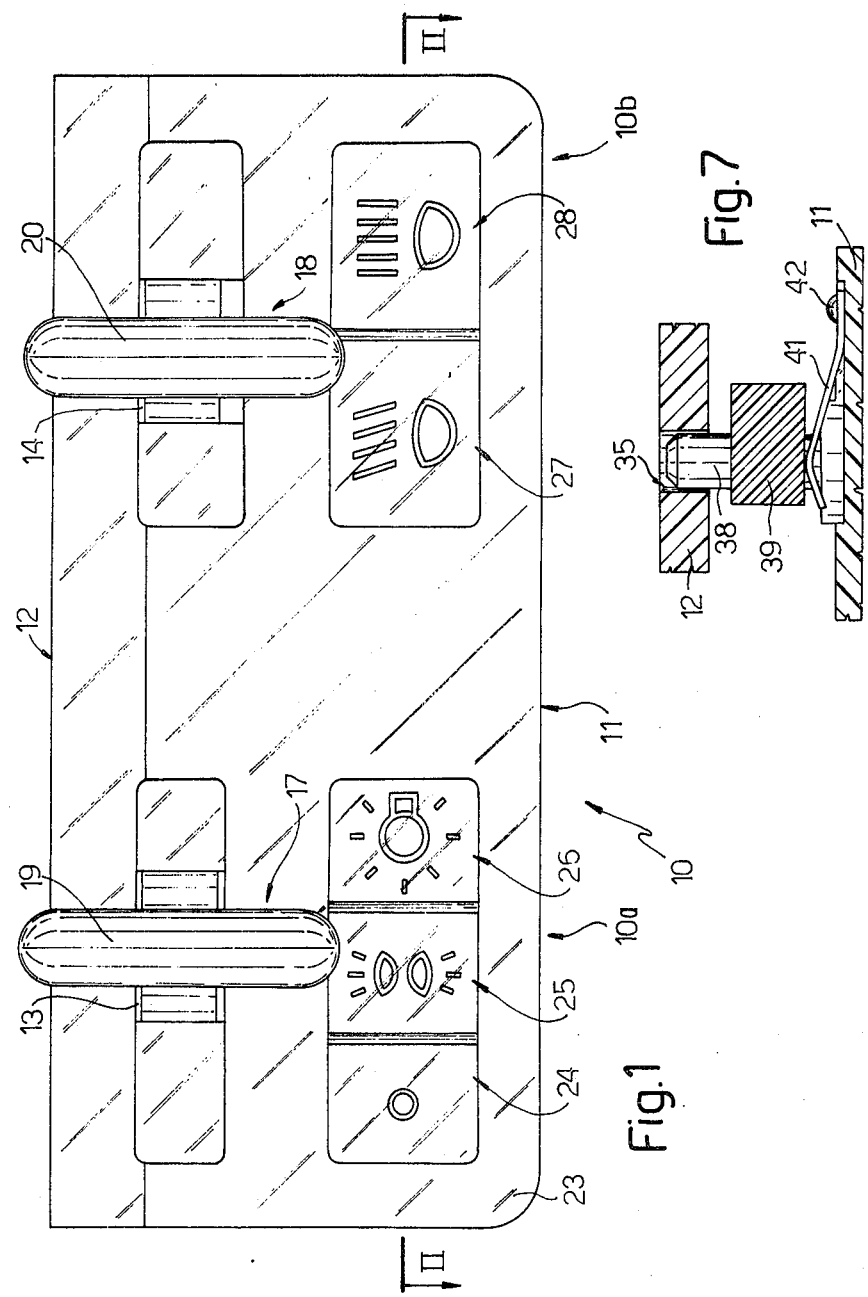
FIG. 1 is a side view of a device formed according to the principles of the present invention.

With particular reference to FIG. 1, a device for controlling the illumination of the headlights of a motor vehicle is generally indicated 10. This device comprises a section 10a for controlling the electrical supply to the lights and a section 10b for the selection of the type of light (dipped headlights or main beam) emitted from the headlamp.

The device 10 can conveniently be housed (in a manner not illustrated) within a space in the dashboard of a motor vehicle and is substantially constituted by a lower body 11 and an upper body 12 defining, along the junction line, a pair of longitudinal slits 13,14 which allow the passage of arms 15,16 (see FIG. 4) of respective levers 17,18. Each lever 17, 18 has a rectangular portion 19,20 at one end of the associated arm 15,16 which serves to facilitate the movement of the lever 17,18 by the driver.

Figure 3:
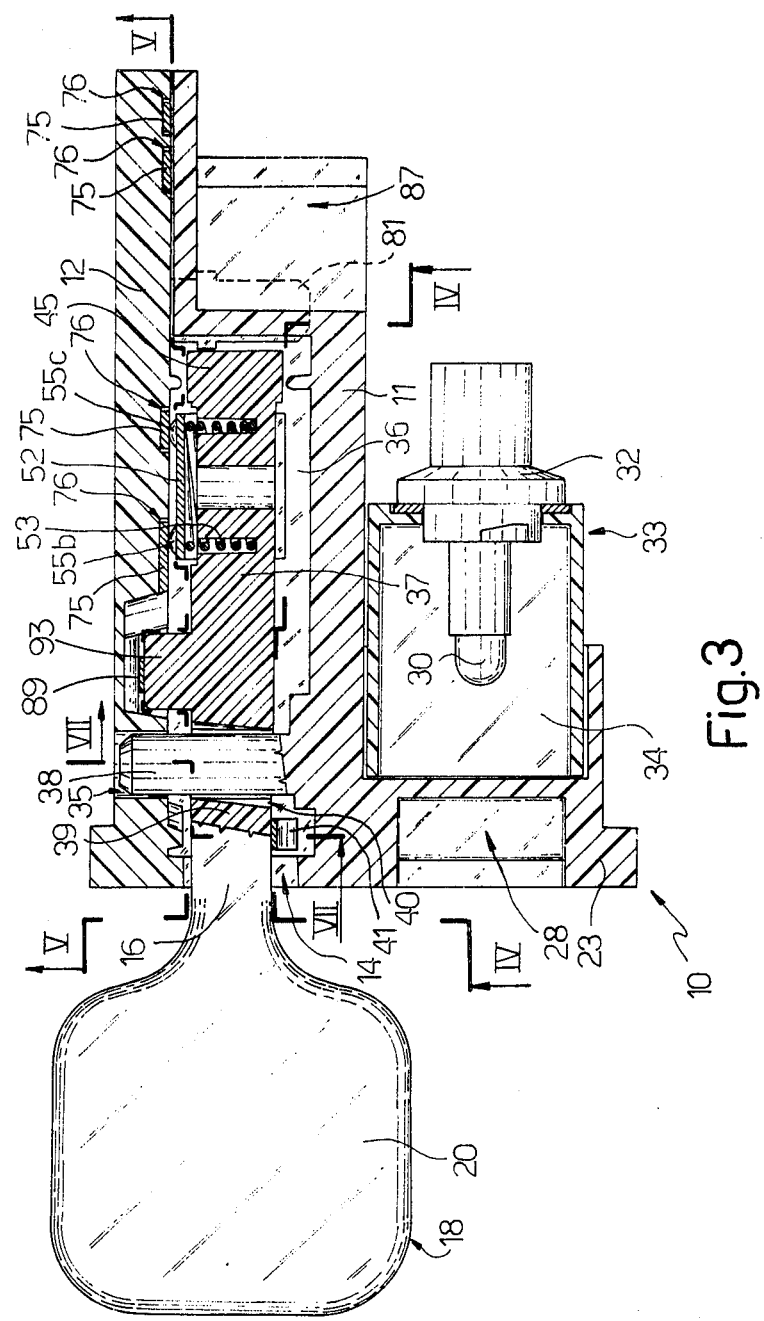
FIG. 3 is a section taken on the line III—III of FIG. 1, this line being seen better in FIG. 4.

With particular reference to FIGS. 1, 2 and 3, it will be seen that the lower body 11 extends beneath the respective levers 17,18 in such a way as to define a projection 23 having a plurality of cavities 24,25, 26,27,28 in the back of which there are visible symbols or ideograms. These ideograms are conveniently made of a material transparent to light and can be illuminated by means of small lamps 29,30 mounted on respective connectors 31,32 each of which is in turn supported by a substantially cup shape support body 33 and having a dividing wall 34 in an intermediate position. The cup body 33 is connected in a manner not illustrated to the projection 23 in such a way that the lamp 29 can illuminate the ideograms in the facing part of the cavities 24,25,26, and the lamp 30 can illuminate the ideograms contained in the cavities 27 and 28. The operating state of the device 10 can be deduced by observing the relative positions of the portions 19,20 of the levers 17,18 with respect to the ideograms. In more detail, when the lever 17 is located in correspondence with the cavity 24 the lights are switched off, and when positioned in correspondence with the cavity 25 the side lights are switched on; when the lever 17 is positioned in front of the cavity 26, not only will the side lights be switched on, but also the dipped headlights or main beam in dependence on whether the lever 18 is positioned in correspondence with the cavity 27 or the cavity 28 respectively.

With particular reference to FIG. 3, the facing surfaces of the lower body 11 and the upper body 12 delimit a chamber 36 within which an arm 37 of the lever 18 is turnable, this arm extending from the opposite side of the arm 16 with respect to a pivot 38 about which the said lever 18 can turn. In more detail, the pivot 38 extends from the body 11 and engages in a corresponding through hole 35 in the body 12; moreover, in correspondence with the pivot 38, the lever 18 has a hub 39 provided with an oblique hole 40. The lever 18 can thus perform both a rotation about the pivot 38 and a rocking movement. This latter movement, as is clearly visible in FIG. 7, is resisted by an opposing leaf spring 41 which has a first end fixed by means of a rivet 42 to the body 11 and a second end which acts on the above mentioned hub 39.

Figure 4:
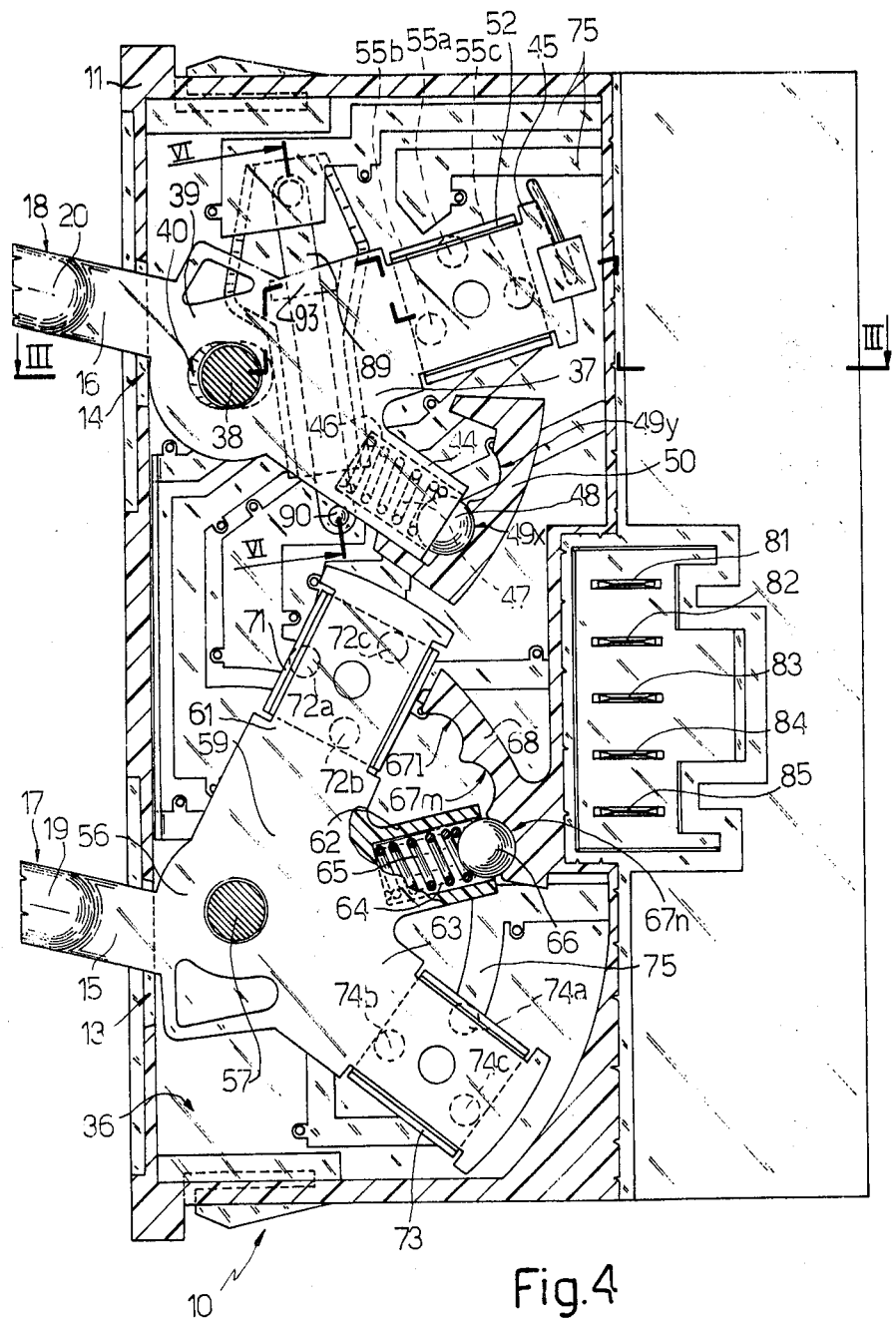
FIG. 4 is a section taken on a line IV—IV of FIG. 3.

With particular reference to FIG. 4, the arm 37 of the lever 18 is forked into two branches, 44 and 45 respectively. The branch 44 has at its end a blind longitudinal hole 46 within which is housed a helical spring 47. This latter presses a ball 48 towards a respective concave seat 49x, 49y formed on a projection 50 of the body 11, in such a way as to establish for the lever 18 two angularly separated stable working positions which can be selected conveniently by the driver by acting externally on the lever 18 itself.

The branch 45 of the arm 37 (see FIGS. 3 and 4) supports a U-shape contact plate 52 maintained pressed against the facing surface of the body 12 by a cylindrical spring 53 lodged in a corresponding annular seat formed in the arm 45 itself. The plate 52 is provided with three contact studs 55a, 55b, 55c positioned substantially at the vertices of an equilateral triangle.

With particular reference to FIG. 4, the lever 17 has a hub 56 rotatable about a pin 57 which, in a manner not illustrated, extends from the body 11 to engage a corresponding through hole in the body 12. From the hub 56 a second branch 59 of the lever 17 extends towards the interior of the above mentioned chamber 36, this arm 59 is separated into three branches respectively indicated 61, 62 and 63. The branch 62 is located in an intermediate position and has a structure substantially similar to the structure of the branch 44 of the lever 18, that is to say having a blind hole 64 in its end housing a helical spring 65 which presses a ball 66 against one of three recesses 67l, 67m, 67n formed on a projection 68 extending from the body 11. In this way the lever 17 can assume three different stable working positions angularly separated from one another and spaced by a predetermined angular value.

The arm 61 and the arm 63 have structures similar to the above described arm 45 of the lever 18; in particular, these support two respective electric contact plates 71, 73, each of which has contact studs 72a, 72b, 72c and 74a, 74b, 74c respectively, these being substantially disposed at the vertices of an equilateral triangle.

The plates 52, 71, and 73 described above can slide on shaped conductive tracks 75 which are received in corresponding seats 76 (see FIG. 3) formed on the part of the surface of the body 12 facing the body 11. Each track 75 is fixed to the body 12 by upsetting one or more projections 78 carried by the body 12 itself; the assembly of tracks 75 is conveniently obtained by cutting a plate of conductive material using a single die, in such a way as to maintain the tracks themselves joined together by means of bridges 79 (see FIG. 5), which are definitively cut when the tracks 75 are positioned in the body 12.

Figure 5:
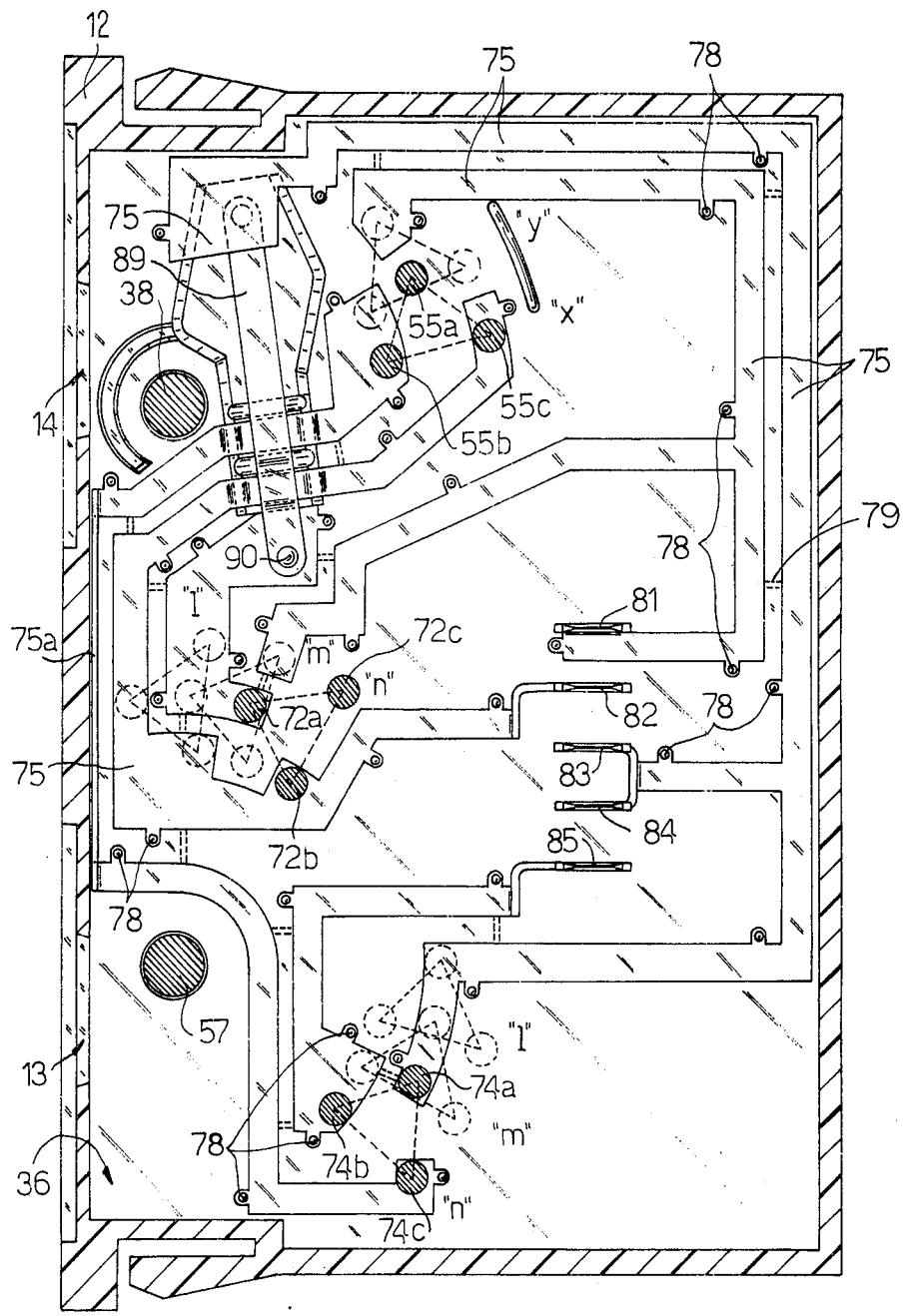
FIG. 5 is a section taken on the line V—V of FIG. 3.

With particular reference to FIGS. 3 and 5, each track 75 has a first end portion or an intermediate zone which is located beneath at least one of the small plates 52, 71, 73 and an opposite end portion which is folded at 90° with respect to the plane on which it rests. These end portions are indicated in order with the reference numerals 81, 82, 83, 84, 85 and are clamped between two facing portions of the upper and lower bodies 12 and 11 respectively of the device 10. In more detail, these portions are, as already mentioned, formed in one piece with the associated conductive tracks 75 but are, however, folded in a somewhat different manner from one another. In particular the portion 81 has a single lateral fold with respect to its associated track 75, the portions 82 and 85 have substantially two folds in such a way as to define an L-shape projection, whilst the portions 83 and 84 branch out into a fork from a single conductive track 75 and are conveniently formed by making three folds at one end of the track 75 itself. Finally, it is to be observed that the tracks 75 are not all disposed in a single plane. For example, in FIGS. 4 and 5 it can be seen that one track 75, which extends along the edge of the body 12 in the peripheral connection region, between the pins 38 and 57, has a section 75a which, after folding, lies in a plane at 90° with respect to the plane in which the other sections of the track 75 lie. The ends from 81 to 85 of the said tracks 75 can be electrically connected with a corresponding electrical connector of a known 5-way type (not illustrated) which is snap-engaged in a space 87 formed by conveniently shaping the lower body 11 (as seen for example in FIG. 3).

With particular reference to FIGS. 4, 5 and 6, as the hub 39 of the lever 18 turns about the pivot 38 it controls the displacement of a resiliently deformable conductive strip 89 one end of which is fixed, by means of a rivet 90, to a conductive track 75 and an opposite end of which carries a metal contact stud 91 which faces a corresponding metal stud 92 fixed to another of the above mentioned conductive tracks 75. In rest conditions, the hub 39 is held in the position illustrated in FIG. 6 by the said spring 41 (see FIG. 7) in such a way that a projection 93 extending from the hub 39 rests on the conductive strip 89 and maintains the studs 91 and 92 spaced from one another. These studs therefore constitute an electric contact set of normally open type which closes only when the lever 18 is turned in such a way as to overcome the resilient reaction which is exerted on it by the spring 41.

Figure 8:
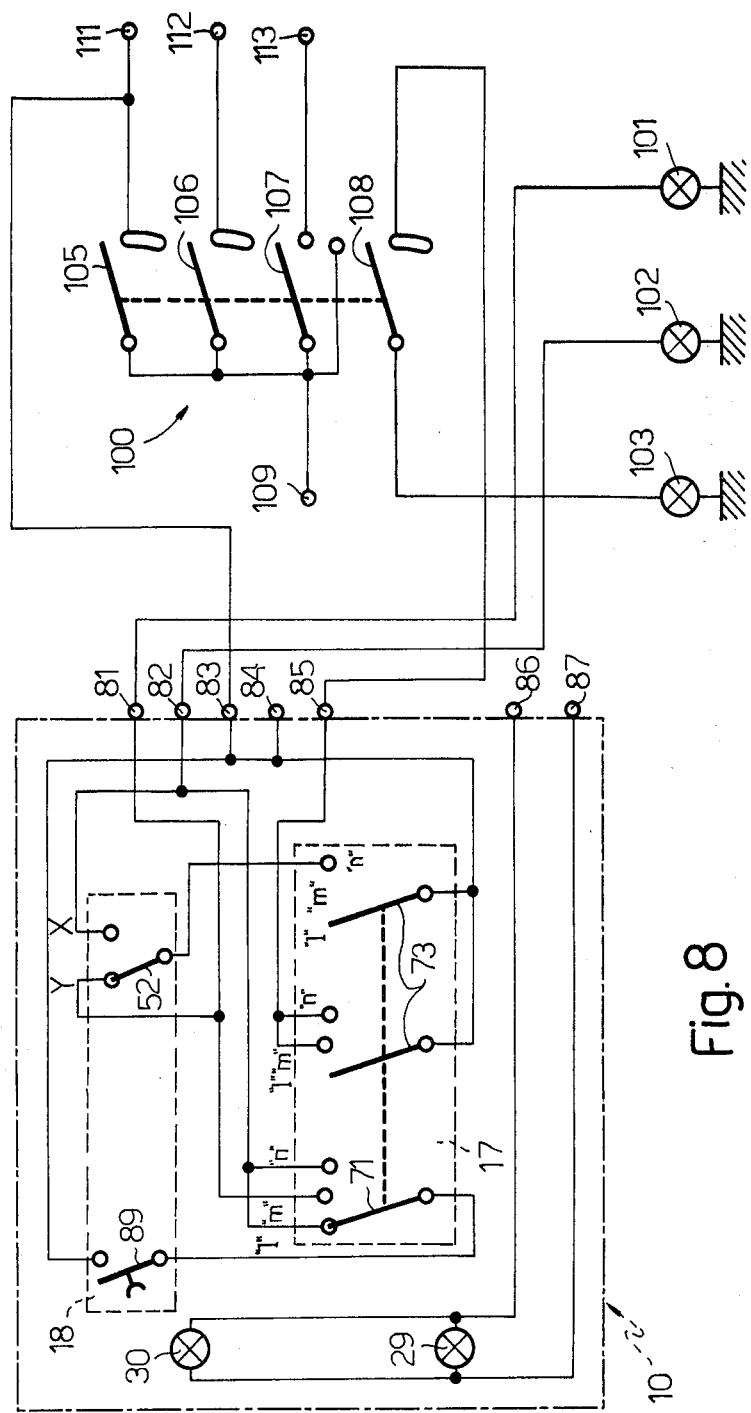
FIG. 8 is an electric circuit diagram of the device in question, illustrated in a typical arrangement.

With particular reference to FIG. 8 there is now briefly described a typical example of application of the device 10, which is here illustrated by an electrical equivalent diagram in which the plates 52, 71, 73, the conductive plate 89, and the tracks 75 are illustrated with respective electrical symbols whilst the same reference numerals are used for these components; in particular the end portions from 81 to 85 will now more properly be called terminals.

As well as the terminals from 81 to 85 there are also indicated two terminals 86 and 87 respectively, in the device 10, which terminals are connected to the terminals of the lamps 29 and 30; the terminals 86 and 87 are connected, in a manner not illustrated, to respective positive and negative poles of a D.C. source of supply such as, for example, the accumulator battery of the motor vehicle. In FIG. 8 the terminals 81 and 82 are respectively connected to earth via lamps 101 and 102 which, in this case, serve to indicate the dipped headlights and main beam respectively of the motor vehicle in question. In FIG. 8 there is likewise indicated a switch unit generally indicated 100, operated by the ignition key of the motor vehicle and substantially comprising four three-position switches 105, 106, 107, 108. Of these, the first three have common terminals connected together and to a terminal 109 conveniently connected in use to the said positive pole. In the illustrated example the switches 105 and 106 are conveniently used to supply the services of the motor vehicle and have a changeover terminal which is connected to a respective associated terminal 111, 112 to which such services are connected; moreover, the changeover terminal of the switch 105 is also connected to the terminal 83 of the device 10. The switch 107 is conveniently employed to supply the starter coil, which in use is connected to a terminal 113 in turn connected to a changeover terminal of the switch 107 itself. The switch 108 has a common terminal earthed via a lamp 103 which in use corresponds to the side lights, and has a changeover terminal connected to the terminal 85 of the device 10 in question.

In FIG. 8 there are finally indicated, with the letters l,m,n and x,y, the working positions which can be assumed by the plates 71,73 and the plate 52 shown in FIGS. 4 and 5.

The operation of the device 10 is now only briefly described with particular reference to FIG. 8, in that the electric diagram which is illustrated in this Figure is substantially known.

First, let us assume that the ignition key is turned, in such a way that a voltage signal of positive value is supplied through the switch 105 to the terminal 83 of the device 10.

The position "l" of the plates 71 and 73 as illustrated in FIG. 8 correspond to the rest condition of the device 10 in which all the lights 101, 102 and 103 are extinguished. It is however possible to supply the main beam lights 102, causing them to flash, by acting on the plate 89, and this is possible by pressing the lever 18. In this condition, in fact, the positive voltage signal present at the terminal 83 is supplied via the strip 89 and the plate 71 to the terminal 82, and from this to the headlamp 102.

The position "m" of the plates 71 and 73 on the other hand causes the illumination of the side lights 103. In this condition, in fact, the positive signal present at the terminal 83 is supplied via the plate 73 to the terminal 85, and from this through the switch 108 to the side lights 103. In these conditions the operation, or rather the rocking of the lever 18 causes, as in the preceding case, closure of the contact constituted by the strip 89; in this case however the dipped headlamps 101 are flashed because the plate 71 transmits the positive voltage signal to the connecting terminal 81.

When the plates 71 and 73 are disposed in the position "n" the positive voltage signal is supplied to the plate 52. Depending on whether this latter is located in the position "x" or "y" there will be corresponding illumination of the main beam lights 102 or else the dipped headlights 101. In these conditions the rocking of the lever 18 always causes flashing of the main beam headlights 102 in that the conductive strip 89 is now connected to the terminal 82 via the plate 71 which is in position "n".

From a study of the characteristics of the device 10 formed according to the principles of the present invention it is possible to see how it achieves the above specified object. In fact, the majority of the constituent parts of the device 10 itself can be made from a simple moulding operation of plastics material. The arrangement adopted for forming the conductive tracks 75 is particularly advantageous; in fact these no longer require the use of the conventional manufacturing techniques for printed circuits with undoubted advantages in relation both to the wastage of material and to the use of labour. Moreover, these tracks are immediately ready to be connected with connectors of conventional type and this also facilitates the use of the device 10 and its eventual maintenance. As far as the end portions 81, 82, 83, 84, 85 of the tracks 75 are concerned, it is important to observe that these are easily made by simply folding the ends of the said tracks 75 one or more times.

The electrical connection between the sliding plates and the conductive tracks is always well ensured by the springs enclosed within the control levers 17,18, whilst the almost total enclosure between the bodies 11 and 12 significantly impedes the ingress of dust and the deposit of such dust on the tracks, with significant advantages for the reliable life of the electrical contact established between the plates and the conductive tracks.

The device 10 is also particularly easy to assemble and particularly effective as far as the display of the functions controlled by it is concerned: in fact, the various symbols or ideograms, in combination with the position of each lever 17,18, provide constant information to the driver.

Finally, it is clear that the above described embodiments of the device 10 can be modified and varied without by this departing from the scope of the present invention.

I claim:
1. A device for controlling the illumination of the lights of a motor vehicle adapted to be mounted in the dashboard of said vehicle, comprising:
 (a) first and second support bodies having internal surfaces, said support bodies being connected together with said surfaces facing each other, said facing surfaces defining a chamber;
 (b) a plurality of tracks disposed in a three dimensional configuration, said tracks comprising conductive material and mounted between said first and second support bodies facing, at least in part, toward said chamber and fixed to a correspondingly configured seat formed in said second support body by means of studs which project from said second support body and over peripheral parts of each of said tracks;
 (c) a first lever pivotably mounted between said first and second bodies, and having a first arm which projects out from said support bodies and which can be manually operated and a second arm moveable within said chamber;
 (d) resilient means interposed between said lever and one of said support bodies and serving to establish a plurality of angular working positions of said lever with respect to said first and second support bodies; and
 (e) a first electric contact element supported by said second arm of said first lever and operable to connect at least two of said tracks.
2. A device as claimed in claim 1, further comprising:
 (a) a second lever pivotably mounted between said support bodies and having a first arm which projects out from said support bodies and which can be manually operated, and a second arm movable within said chamber, and

(b) second and third electric contact elements supported by said second arm of said second lever and operable to connect a least two of said conductive tracks.

3. A device as claimed in claim 2, wherein said plurality of conductive tracks is a single appropriately configured piece of metallic material, said conductive tracks being connected by means of breakable bridges.

4. A device as claimed in claim 2, wherein said tracks comprise a first plurality of zones on which said electric element slide, and a second plurality of zones which project out from said first body and which are adapted to be connected to corresponding electrical connectors.

5. A device as claimed in claim 4, wherein each of said second plurality of zones is bent with respect to a plane defined by said first plurality of zones.

6. A device as claimd in claim 5, wherein all of said second plurality of zones are bent at 90° with respect to said plane and are arranged in such a way as to be oriented in parallel.

7. A device as claimed in claim 5, wherein at least one pair of said second plurality of zones are connected to each other by a conductive portion which is bent at 90° with respect to said second plurality of zones.

8. A device as claimed in claim 4, wherein at least one pair of said first plurality of zones is connected by a portion of track which lies perpendicular to its plane.

9. A device as claimed in claim 2, further comprising at least one conductive strip having one end connected to a first track of said plurality of tracks and an opposite end adapted to be pressed into contact with a second track of said plurality of tracks by means of said first lever, said first lever having an oblique hole adjacent to an associated pivot pin such that said oblique hole allows rocking of said first lever and consequent engagement of said conductive strip.

10. A device as claimed in claim 9, further comprising a biasing spring which is supported by said first support body and which transmits to the said first lever a resilient force to hold said first lever in a predetermined rest position.

11. A device as claimed in claim 2, further comprising resilient means housed in said first lever for maintaining said first electric contact element pressed against said conductive tracks.

12. A device as claimed in claim 2, wherein said first support body comprises a projection on which there are formed symbols relating to the functions performed by said device.

13. A device as claimed in claim 12, further comprising means for illumination of said symbols.

14. A method for assembling a motor vehicle light control device having a plurality of conductive tracks and an upper body, comprising the steps of:
 (a) cutting said plurality of conductive tracks from a plate of metallic material by means of a single die such that said conductive tracks are connected by breakable bridges;
 (b) folding of said plurality of conductive tracks in accordance with the desired configuration;
 (c) positioning said plurality of conductive tracks relative to said upper body;
 (d) breaking said breakable bridges; and
 (e) fixing said plurality of conductive tracks to said upper body.

* * * * *